(12) United States Patent
Wang et al.

(10) Patent No.: US 11,813,652 B2
(45) Date of Patent: Nov. 14, 2023

(54) HYDRAULICALLY CONTROLLED BACKING ROLLER

(71) Applicant: TAIYUAN UNIVERSITY OF TECHNOLOGY, Shanxi (CN)

(72) Inventors: Tao Wang, Shanxi (CN); Qingshan Ding, Shanxi (CN); Shufeng Wei, Shanxi (CN); Zhenhua Wang, Shanxi (CN); Xiao Liu, Shanxi (CN); Xiaobin Fu, Shanxi (CN); Zhongkai Ren, Shanxi (CN)

(73) Assignee: TAIYUAN UNIVERSITY OF TECHNOLOGY, Shanxi (CN)

( * ) Notice: Subject to any disclaimer, the term of this patent is extended or adjusted under 35 U.S.C. 154(b) by 0 days.

(21) Appl. No.: 17/974,338

(22) Filed: Oct. 26, 2022

(65) Prior Publication Data
US 2023/0052873 A1   Feb. 16, 2023

(30) Foreign Application Priority Data
Jun. 8, 2022   (CN) .......................... 202210641949.4

(51) Int. Cl.
*B21B 29/00*   (2006.01)

(52) U.S. Cl.
CPC ........ *B21B 29/00* (2013.01); *B21B 2203/182* (2013.01); *B21B 2261/04* (2013.01); *B21B 2263/04* (2013.01)

(58) Field of Classification Search
CPC .... B21B 29/00; B21B 2203/182; B21B 13/14
See application file for complete search history.

(56) References Cited

U.S. PATENT DOCUMENTS

| | | | | |
|---|---|---|---|---|
| 5,471,859 A | * | 12/1995 | Sendzimir ............... | B21B 27/03 72/241.4 |
| 7,234,334 B1 | * | 6/2007 | Pfabe ...................... | B21B 29/00 72/224 |

FOREIGN PATENT DOCUMENTS

| | | | | | |
|---|---|---|---|---|---|
| CN | | 1253526 A | * | 5/2000 | ............. B21B 27/05 |
| CN | | 105689393 A | * | 6/2016 | |
| WO | WO-2021149747 A1 | * | 7/2021 | ........... B21B 13/147 |

OTHER PUBLICATIONS

Translation of WO-2021149747 (Year: 2021).*
Translation of CN-1253526 (Year: 2000).*
Translation of CN-105689393 (Year: 2016).*

* cited by examiner

*Primary Examiner* — Bobby Yeonjin Kim

(57) ABSTRACT

A hydraulically controlled backing roller includes a mandrel, two cover plates which are installed at two ends of the mandrel through screws respectively, and two screwdown gears which are installed at two end portions of the mandrel respectively. The two screwdown gears are engaged with an output rack of a screwdown hydraulic cylinder, multiple saddle ring sets are sleeved on the mandrel at equal intervals, a saddle ring of each of the saddle ring sets is fixed with a frame through a fan-shaped plate, a backing bearing is provided between two adjacent saddle ring sets; an inner eccentric ring of the each of the saddle ring sets is driven to rotate by hydraulic driving, so that the mandrel has a deflection deformation, and the deflection deformation is transmitted to other adjacent rollers through the backing bearing.

2 Claims, 3 Drawing Sheets

HYDRAULICALLY CONTROLLED BACKING ROLLER

CROSS REFERENCE OF RELATED APPLICATION

The present invention claims priority under 35 U.S.C. 119(a-d) to CN 202210641949.4, filed Jun. 8, 2022.

BACKGROUND OF THE PRESENT INVENTION

Field of Invention

The present invention relates to the field of backing roller technology, and more particularly to a hydraulically controlled backing roller.

Description of Related Arts

Ultra-thin metal strips are the important basic materials in the national emerging high-tech fields, and are mainly used in military and civil high-tech products such as aerospace, nuclear power equipment, and flexible display screens. With the continuous development of science and technology, various ultra-thin and ultra-precision metal strips are increasingly used in industry and other fields. The demand for metal strips is also increasing year by year, so the market potential is very huge. The flatness is an index that indicates that the strip loses its flat shape and surface characteristics and has shape defects such as wave shape and warpage when there is no external force. The direct cause of the flatness defect is the uneven deformation of the strip in the width direction during rolling, and the interacting internal stress in the width direction of the strip. When the internal stress reaches a certain amount, the compressed part of the strip will be unstable and cause a wave shape. The flatness is a key indicator for measuring products, and the shape control is the most complex and difficult technology in rolling production. At present, in the production process of cold-rolled strip, the shape control is mainly carried out by the traditional backing roller. The outer eccentric ring of the backing roller is driven by the piston rod rack at the output end of the convexity hydraulic cylinder engaging with two fan-shaped gears. In the direction of the mandrel, multiple backing rollers are placed. Through different reductions of the outer eccentric rack, the segmented action is achieved on the mandrel, so that the mandrel has the deflection deformation. The deflection deformation is transmitted to the work rolls through the tower roll system, and finally acts on the strip to control the flatness of the strip. However, the engaging method of the rack and pinion will reduce the adjustment accuracy of the backing roller due to wear and tear, causing vibration and adversely affecting the production of the strip. At the same time, the engaging method of the rack and pinion is inconvenient for the disassembly and replacement of the backing roller, which will also reduce the production efficiency of the machine in actual production.

SUMMARY OF THE PRESENT INVENTION

Aiming at the above technical problems, the present invention provides a new hydraulically controlled backing roller.

The present invention provides technical solutions as follows.

A hydraulically controlled backing roller comprises a mandrel, two cover plates which are installed at two ends of the mandrel through screws respectively, and two screwdown gears which are installed at two end portions of the mandrel respectively, wherein:

the two screwdown gears are configured to be engaged with an output rack of a screwdown hydraulic cylinder, multiple saddle ring sets are sleeved on the mandrel at equal intervals, a saddle ring of each of the saddle ring sets is configured to be fixed with a frame through a fan-shaped plate, a backing bearing is provided between two adjacent saddle ring sets; an inner eccentric ring of the each of the saddle ring sets is driven to rotate by hydraulic driving, so that the mandrel has a deflection deformation, and the deflection deformation is transmitted to other adjacent rollers through the backing bearing.

Preferably, the each of the saddle ring sets comprises a saddle ring, an outer eccentric ring, an inner eccentric ring, two outer eccentric ring rotors, two outer eccentric ring stators, multiple rotor blades and two valve plates, wherein the saddle ring is configured to be fixedly connected with the frame through the fan-shaped plate, the outer eccentric ring is provided within the saddle ring, an outer circle of the outer eccentric ring is coaxial with an inner hole of the saddle ring, the inner eccentric ring is provided within the outer eccentric ring, an outer ring of the inner eccentric ring is concentric with an inner circle of the outer eccentric ring, multiple needle bearings are provided between the saddle ring and the outer eccentric ring and are provided between the outer eccentric ring and the inner eccentric ring, the two outer eccentric ring rotors are fixed at two sides of the outer eccentric ring through pins respectively for realizing a synchronous rotation of the two outer eccentric ring rotors and the outer eccentric ring, the multiple rotor blades are evenly distributed on each of the two outer eccentric ring rotors for withstanding the thrust of hydraulic oil, the two outer eccentric ring stators are fixed at two sides of the saddle ring through screws respectively, two hydraulic oil ports are provided on the two outer eccentric ring stators respectively for inflow and outflow of hydraulic oil, two sunken passages are provided at two surfaces of the two outer eccentric ring stators which are opposite to each other respectively, the two sunken passages have two counter bores respectively for guiding hydraulic oil, the two valve plates are provided within the two passages respectively, each of the two valve plates has two recesses which are symmetrical to each other for introducing hydraulic oil into a chamber which is provided between an inner circumferential surface of one of the two passages and an outer circumferential surface of one of the two outer eccentric ring rotors, the one of the two outer eccentric ring rotors is provided within the one of the two passages, an oil baffle and an oil retaining ring are provided between the one of the two outer eccentric ring rotors and one of the two outer eccentric ring stators which is corresponding to the one of the two outer eccentric ring rotors, for sealing to reduce leakage of hydraulic oil.

Preferably, the each of the two valve plates is elliptical.

Compared with the prior art, the present invention has some advantages as follows.

(1) Compared with the external eccentric structure of rack and pinion of hydraulic cylinder, the hydraulically controlled backing roller provided by the present invention is simple in mechanical structure and low in manufacturing cost.

(2) Compared with the external eccentric structure of rack and pinion of hydraulic cylinder, the hydraulically controlled backing roller provided by the present invention is convenient for disassembly, assembly and maintenance, which reduces the operation and maintenance cost of the rolling mill.

(3) Compared with the external eccentric structure of rack and pinion of hydraulic cylinder, the outer eccentric ring of the backing roller provided by the present invention is hydraulically controlled, so that the mandrel has the deflection deformation. The backing roller is fast in control and response, is more flexible and accurate in control, and is fast in command response speed of the hydraulic system is fast. Moreover, the correction time is shortened, and the sensitivity is improved in the present invention.

(4) Compared with the external eccentric structure of rack and pinion of hydraulic cylinder, the outer eccentricity control is performed on the backing roller provided by the present invention in the hydraulic control manner, which has long service life, stable operation, low noise and strong flexibility.

Figure 1:
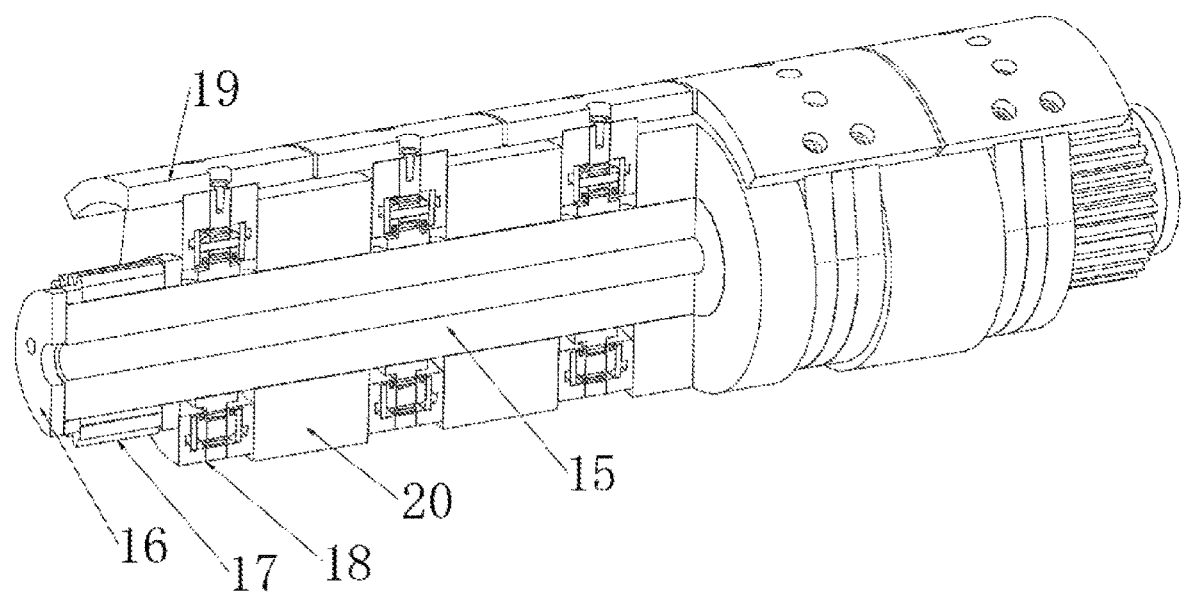
FIG. 1 is a structurally schematic diagram of a hydraulically controlled backing roller provided by the present invention.

In the drawings, 1: saddle ring; 2: outer eccentric ring; 3: inner eccentric ring; 4: outer eccentric ring rotor; 5: outer eccentric ring stator; 6: rotor blade; 7: valve plate; 8: needle bearing; 9: hydraulic oil port; 10: sunken passage; 11: counter bore; 12: recess; 13: oil baffle; 14: oil retaining ring; 15: mandrel; 16: cover plate; 17: screwdown gear; 18: saddle ring set; 19: fan-shaped plate; 20: backing bearing.

DETAILED DESCRIPTION OF THE PREFERRED EMBODIMENT

In order to further illustrate the technical solutions of the present invention, the present invention will be further described through embodiments as follows.

Technical Solutions

Figure 2:
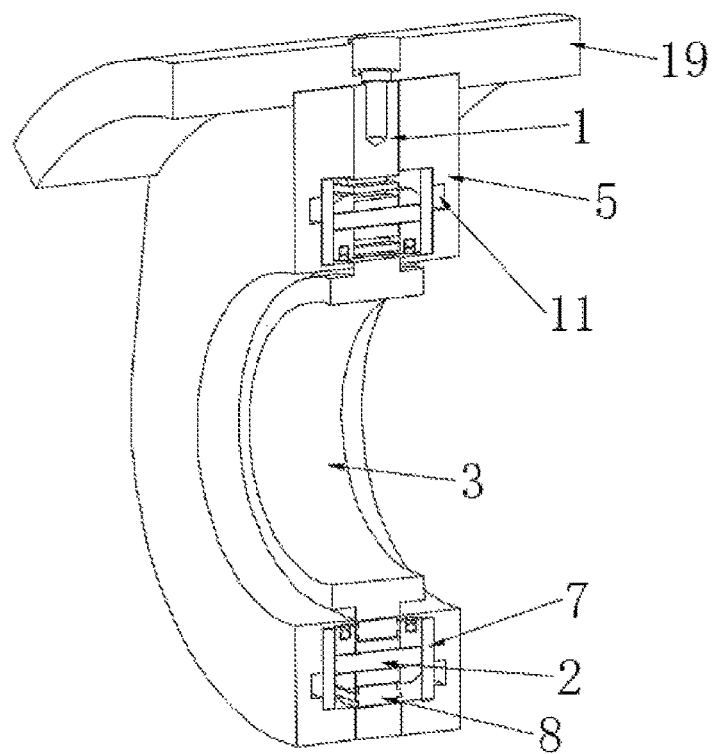
FIG. 2 is a connection diagram of multiple saddle ring sets and a fan-shaped plate of the backing roller.
Figure 3:
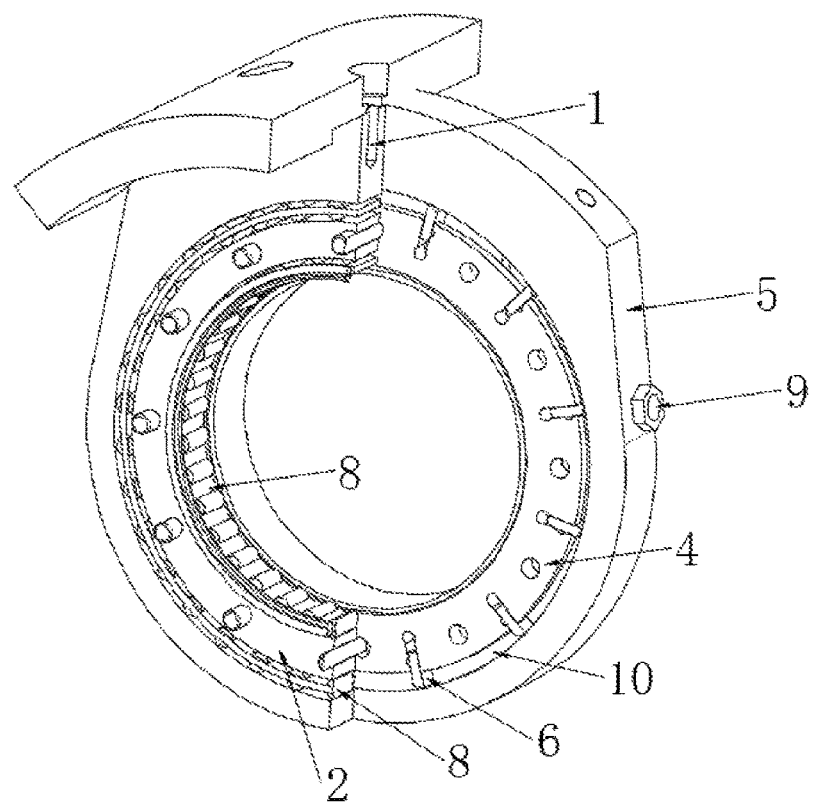
FIG. 3 is a connection diagram of one saddle ring set of the backing roller.
Figure 4:
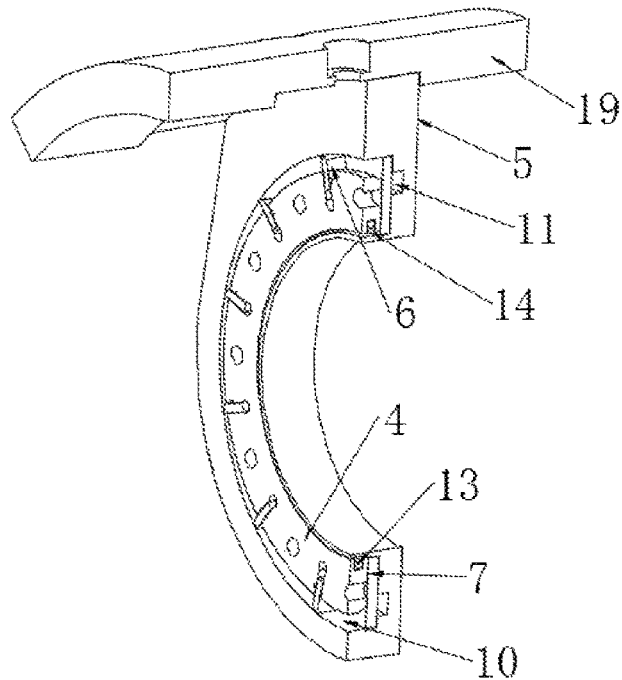
FIG. 4 is a connection diagram of an outer eccentric ring stator of the backing roller.
Figure 5:
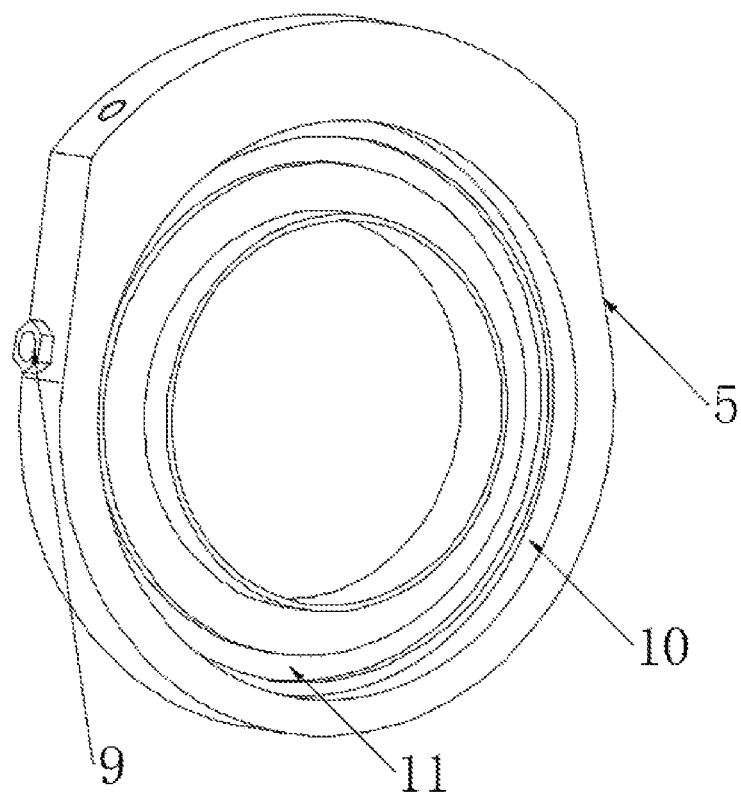
FIG. 5 is a structurally schematic diagram of an outer eccentric ring rotor of the backing roller.
Figure 6:
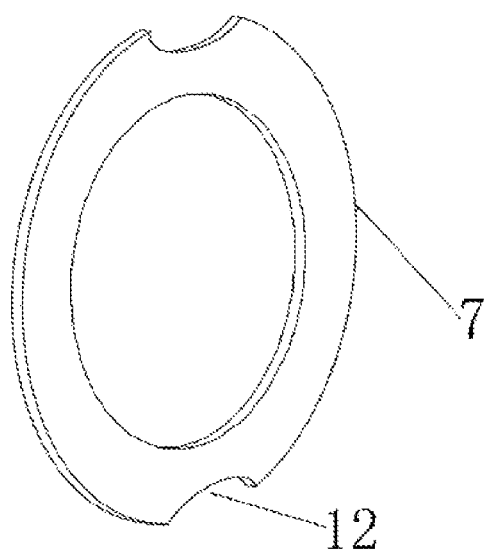
FIG. 6 is a structurally schematic diagram of a valve plate of the backing roller.

Referring to FIGS. 1 to 6, a hydraulically controlled backing roller according to a preferred embodiment of the present invention is illustrated, which comprises a mandrel 15, two cover plates 16 which are installed at two ends of the mandrel 15 through screws respectively, and two screwdown gears 17 which are installed at two end portions of the mandrel 15 respectively, wherein the two screwdown gears 17 are engaged with an output rack of a screwdown hydraulic cylinder, multiple saddle ring sets 18 are sleeved on the mandrel 15 at equal intervals, a saddle ring 1 of each of the saddle ring sets 18 is fixed with a frame through a fan-shaped plate 19, a backing bearing 20 is provided between two adjacent saddle ring sets 18, an inner eccentric ring 3 of the each of the saddle ring sets 18 is driven to rotate by hydraulic driving, so that the mandrel 15 has a deflection deformation, and the deflection deformation is transmitted to other adjacent rollers through the backing bearing 20.

The each of the saddle ring sets 18 comprises a saddle ring 1, an outer eccentric ring 2, an inner eccentric ring 3, two outer eccentric ring rotors 4, two outer eccentric ring stators 5, multiple rotor blades 6 and two valve plates 7, wherein the saddle ring 1 is fixedly connected with the frame through the fan-shaped plate 19, the outer eccentric ring 2 is provided within the saddle ring 1, an outer circle of the outer eccentric ring 2 is coaxial with an inner hole of the saddle ring 1, the inner eccentric ring 3 is provided within the outer eccentric ring 2, an outer ring of the inner eccentric ring 3 is concentric with an inner circle of the outer eccentric ring 2, multiple needle bearings 8 are provided between the saddle ring 1 and the outer eccentric ring 2 and are provided between the outer eccentric ring 2 and the inner eccentric ring 3, the two outer eccentric ring rotors 4 are fixed at two sides of the outer eccentric ring 2 through pins respectively for realizing a synchronous rotation of the two outer eccentric ring rotors 4 and the outer eccentric ring 2, the multiple rotor blades 6 are evenly distributed on each of the two outer eccentric ring rotors 4 for withstanding the thrust of hydraulic oil, the two outer eccentric ring stators 5 are fixed at two sides of the saddle ring 1 through screws respectively, two hydraulic oil ports 9 are provided on the two outer eccentric ring stators 5 respectively for inflow and outflow of hydraulic oil, two sunken passages 10 are provided at two surfaces of the two outer eccentric ring stators 5 which are opposite to each other respectively, the two sunken passages 10 have two counter bores 11 respectively for guiding hydraulic oil, the two valve plates 7 which are elliptical are provided within the two sunken passages 10 respectively, each of the two valve plates 7 has two recesses 12 which are symmetrical to each other for introducing hydraulic oil into a chamber which is provided between an inner circumferential surface of one of the two passages 10 and an outer circumferential surface of one of the two outer eccentric ring rotors 4, the one of the two outer eccentric ring rotors 4 is provided within the one of the two passages 10, an oil baffle 13 and an oil retaining ring 14 are provided between the one of the two outer eccentric ring rotors 4 and one of the two outer eccentric ring stators 5 which is corresponding to the one of the two outer eccentric ring rotors 4, for sealing to reduce leakage of hydraulic oil.

The present invention is based on transmission and control of the hydraulic system. Through the two hydraulic oil ports 9, the hydraulic oil is introduced into the backing roller; and then under an action of the two valve plates 7, the hydraulic oil is injected into the chamber which is provided between the inner circumferential surface of one of the two passages 10 and the outer circumferential surface of one of the two outer eccentric ring rotors 4 for forming a high-pressure chamber; and then the hydraulic oil acts on the rotor blades 6 to drive the two outer eccentric ring rotors 4, so as to drive the outer eccentric ring 2 to rotate through pins; due to the rotation of the outer eccentric ring 2, the inner eccentric ring 3 provided within the outer eccentric ring 2 is driven to rotate; the inner eccentric ring 3 is connected with the mandrel 15, the two ends of the mandrel are locked by the two screwdown gears 17 respectively, so the mandrel 15 has the deflection deformation; through the backing bearing 20, the deflection deformation is applied to a working roll, and then is applied to a metal strip, so as to control the flatness of an ultra-thin metal strip.

The main features and advantages of the present invention have been described above. It is apparent for those skilled in the art that the present invention is not limited to the details of the above-described exemplary embodiments, but that the present invention may be embodied in other specific forms without departing from the spirit or essential characteristics of the present invention. Therefore, the embodiments should be regarded as exemplary and non-restrictive in all respects. The scope of the present invention is defined by the appended claims rather than the foregoing description, and therefore includes all variations that fall within the meaning and scope of the equivalent elements of the claim.

In addition, it should be understood that although this specification is described in terms of embodiments, not each embodiment only includes an independent technical solution. This description in the specification is only for the sake of clarity, and those skilled in the art should take the specification as a whole, and the technical solutions in each embodiment are also able to be appropriately combined to form other implementations that are able to be understood by those skilled in the art.

What is claimed is:

1. A hydraulically controlled backing roller, which comprises a mandrel, two cover plates which are installed at two ends of the mandrel through screws respectively, and two screwdown gears which are installed at two end portions of the mandrel respectively, wherein: the two screwdown gears are configured to be engaged with an output rack of a screwdown hydraulic cylinder, multiple saddle ring sets are sleeved on the mandrel at equal intervals, a saddle ring of each of the saddle ring sets is configured to be fixed with a frame through a fan-shaped plate, a backing bearing is provided between two adjacent saddle ring sets; an inner eccentric ring of each of the saddle ring sets is driven to rotate by hydraulic driving, so that the mandrel has a deflection deformation, and the deflection deformation is transmitted to other adjacent rollers through the backing bearing; and wherein each of the saddle ring sets comprises a saddle ring, an outer eccentric ring, an inner eccentric ring, two outer eccentric ring rotors, two outer eccentric ring stators, multiple rotor blades and two valve plates, wherein the saddle ring is configured to be fixedly connected with the frame through the fan-shaped plate, the outer eccentric ring is provided within the saddle ring, an outer circle of the outer eccentric ring is coaxial with an inner hole of the saddle ring, the inner eccentric ring is provided within the outer eccentric ring, an outer ring of the inner eccentric ring is concentric with an inner circle of the outer eccentric ring, multiple needle bearings are provided between the saddle ring and the outer eccentric ring and are provided between the outer eccentric ring and the inner eccentric ring, the two outer eccentric ring rotors are fixed at two sides of the outer eccentric ring through pins respectively for realizing a synchronous rotation of the two outer eccentric ring rotors and the outer eccentric ring, the multiple rotor blades are evenly distributed on each of the two outer eccentric ring rotors for withstanding the thrust of hydraulic oil, the two outer eccentric ring stators are fixed at two sides of the saddle ring through screws respectively, two hydraulic oil ports are provided on the two outer eccentric ring stators respectively for inflow and outflow of hydraulic oil, two sunken passages are provided at two surfaces of the two outer eccentric ring stators which are opposite to each other respectively, the two sunken passages have two counter bores respectively for guiding hydraulic oil, the two valve plates are provided within the two passages respectively, each of the two valve plates has two recesses which are symmetrical to each other for introducing hydraulic oil into a chamber which is provided between an inner circumferential surface of one of the two passages and an outer circumferential surface of one of the two outer eccentric ring rotors, the one of the two outer eccentric ring rotors is provided within the one of the two passages, an oil baffle and an oil retaining ring are provided between the one of the two outer eccentric ring rotors and one of the two outer eccentric ring stators which is corresponding to the one of the two outer eccentric ring rotors, for sealing to reduce leakage of hydraulic oil.

2. The hydraulically controlled backing roller according to claim 1, wherein each of the two valve plates is elliptical.

* * * * *